(12) United States Patent
Van Den Bossche (10) Patent No.: US 12,061,177 B2
(45) Date of Patent: Aug. 13, 2024

(54) METHOD AND SYSTEM FOR ANALYSING A TEST PIECE

(71) Applicant: GRINDOSONIC BV, Leuven (BE)

(72) Inventor: Alex Van Den Bossche, Neerijse (BE)

(73) Assignee: GRINDOSONIC BV, Leuven (BE)

( * ) Notice: Subject to any disclaimer, the term of this patent is extended or adjusted under 35 U.S.C. 154(b) by 384 days.

(21) Appl. No.: 17/620,300

(22) PCT Filed: Jun. 22, 2020

(86) PCT No.: PCT/EP2020/067389
§ 371 (c)(1),
(2) Date: Dec. 17, 2021

(87) PCT Pub. No.: WO2020/254698
PCT Pub. Date: Dec. 24, 2020

(65) Prior Publication Data
US 2022/0244156 A1    Aug. 4, 2022

(30) Foreign Application Priority Data

Jun. 20, 2019 (EP) .................................. 19181500

(51) Int. Cl.
*G01N 3/54* (2006.01)
*G01N 3/32* (2006.01)
(Continued)

(52) U.S. Cl.
CPC ............... *G01N 3/54* (2013.01); *G01N 3/32* (2013.01); *G01N 3/405* (2013.01); *G01N 29/045* (2013.01); *G01N 29/228* (2013.01); *G01N 2203/0039* (2013.01); *G01N 2203/021* (2013.01); *G01N 2291/0289* (2013.01)

(58) Field of Classification Search
CPC .. G01N 3/00; G01N 3/30; G01N 3/32; G01N 3/40; G01N 3/405; G01N 3/54;
(Continued)

(56) References Cited

U.S. PATENT DOCUMENTS 6,782,970 B2     8/2004   Chang
2007/0157698 A1  7/2007   Allaire et al.
(Continued)

FOREIGN PATENT DOCUMENTS

GB    2415256 A      12/2005
JP    H05332908 A    12/1993
(Continued)

OTHER PUBLICATIONS

Machine Translation of KR 20160001824 A (Year 2016).*
(Continued)

*Primary Examiner* — Nguyen Q. Ha
(74) *Attorney, Agent, or Firm* — Workman Nydegger (57) ABSTRACT

A method for acoustically measuring material properties of a test piece at high temperatures, includes the steps of: heating the test piece to within a testing temperature range; performing a background measurement within said testing temperature range by capturing a vibrational signal from the test piece within a calibration period, thereby obtaining a noise signal; performing an acoustic measurement on said test piece within said testing temperature range and within a testing period by: imparting a vibrational excitation onto the test piece; capturing a vibrational signal of the test piece within the testing period, thereby obtaining a vibrational response signal to said vibrational excitation, and obtaining the material properties of the test piece by analyzing the vibrational response signal, thereby taking into account the noise signal. A system is provided for acoustically measuring material properties of a test piece at high temperatures.

10 Claims, 3 Drawing Sheets

(51) Int. Cl.
*G01N 3/40* (2006.01)
*G01N 29/04* (2006.01)
*G01N 29/22* (2006.01)

(58) Field of Classification Search
CPC ...... G01N 29/00; G01N 29/04; G01N 29/045; G01N 29/11–12; G01N 29/22; G01N 29/228; G01N 2203/0039; G01N 2203/021; G01N 2291/0289
See application file for complete search history.

(56) References Cited

U.S. PATENT DOCUMENTS

| | | | |
|---|---|---|---|
| 2015/0300933 A1 | 10/2015 | Jackson et al. | |
| 2022/0003648 A1* | 1/2022 | Suetti | G01N 3/317 |

FOREIGN PATENT DOCUMENTS

| | | | | |
|---|---|---|---|---|
| JP | H11281599 A | | 10/1999 | |
| KR | 20160001824 A | * | 1/2016 | G01N 3/30 |
| WO | 2019020825 A1 | | 1/2019 | |

OTHER PUBLICATIONS

Biswas et al., "Thermal Expansion, Elasticity, and Internal Friction of Polycrystalline PZT Ceramic," American Ceramic Society Bulletin, vol. 58, No. 8, Aug. 31, 1979, 2 Pages.

Huang et al., "Time Domain Doppler Estimators of the Amplitude of Vibrating Targets," The Journal of the Acoustical Society of America, vol. 91, No. 2, Feb. 28, 1992, pp. 965-974.

Kazys et al., "Ultrasonic Technique for Vibration Measurements," retrieved from https://www.ndt.net/article/wcndt00/papers/idn246/idn246.htm on Dec. 10, 2021, 4 Pages.

Mandelshtam et al., "Harmonic Inversion of Time Signals and its Applications," Journal of Chemical Physics, vol. 107, No. 17, Nov. 1, 1997, pp. 6756-6769.

Roebben et al., "Impulse Excitation Apparatus to Measure Resonant Frequencies, Elastic Moduli, and Internal Friction at Room and High Temperature," Review of Scientific Instruments, vol. 68, No. 12, Dec. 1, 1997, pp. 4511-4515.

Tapson, "High Precision, Short Range Ultrasonic Sensing by Means of Resonance Mode-Locking," Ultrasonics, vol. 33, No. 6, Jul. 6, 1995, pp. 441-444.

Extended European Search Report from corresponding European Application No. 19181500.0, Nov. 26, 2019.

International Preliminary Report on Patentability from corresponding PCT Application No. PCT/EP2020/067389, Oct. 8, 2021.

International Search Report and Written Opinion from corresponding PCT Application No. PCT/EP2020/067389, Dec. 9, 2020.

PCT Direct/Informal Comments from corresponding European Application No. 19181500.0, Jun. 22, 2020, 4 pages.

PCT Demand and Comments from corresponding PCT Application No. PCT/EP2020/067389, Apr. 20, 2021, 3 pages.

Response to Written Opinion of the IPEA from corresponding PCT Application No. PCT/EP2020/067389, Sep. 9, 2021.

Japanese Office Action from Corresponding Japanese Patent Application No. JP 2021-575422, Mar. 13, 2024.

* cited by examiner

METHOD AND SYSTEM FOR ANALYSING A TEST PIECE

TECHNICAL FIELD

The present invention relates to a method and system for analysing a test piece using sound or ultrasound waves. It is particularly useful for detecting defects and anomalies in solids, and characterizing the E-modulus, G-modulus and Poisson's constant.

The present invention also relates to a method and system for obtaining a thermal expansion parameter of a test piece.

BACKGROUND

Testing of solids can be done in a number of ways. A first test usually consists of a visual inspection to see if a solid has the right size and shape, and to check for surface defects. However, in many cases the properties of the solid depend largely on internal structure, which can be invisible. For instance, the strength of metals and alloys depends largely on certain types and amount of bulk defects. These defects can be both small and large, and could occur because of natural causes, because of the manner of production, because of wear and tear, because of accidents, etc.

Independent of how the defects occur, it is in some cases important to know the state of a solid with respect to its defects. In order to analyse a solid for defects, one can use an invasive method or a non-invasive method on a test piece of the solid. A non-invasive method hereby allows analysis without destroying or altering the test piece. Hence, non-invasive methods are typically used for test pieces which still need to be used later, or which need to undergo further tests (which could themselves be invasive or non-invasive).

One type of non-invasive testing method for solids uses vibrations to analyse the test piece. Hereby the test piece is subjected to controlled vibrations which can propagate through the solid, hereby being transmitted, reflected or absorbed. The controlled vibrations may be induced with an impact excitation technique (IET), whereby the test piece is positioned in such a way that it can vibrate substantially unhindered upon being impacted. In impulse excitation techniques, the material properties of test piece are then determined by impacting the sample with a dedicated tool or projectile, and analysing the resulting vibrations as they are picked up with a vibration signal measurement sensor, such as a piezoelectric sensor, a microphone, a laser vibrometer or an accelerometer. Vibrations through solid are also referred to as sound or as sound waves and the measurements are also referred to as acoustic measurements. A vibration signal measurement sensor is therefor also termed "acoustic sensor" in the context of this application.

An apparatus for testing a solid using sound has been described in international application WO 2019/020825 A1. This document discloses an apparatus for analysing a mechanical vibratory response of a solid material sample, the apparatus comprising: an array of impactors arranged to impart an impact on respective well-defined points on the surface of said solid material sample; a sensor configured to capture said mechanical vibratory response as a time-varying signal, subsequent to an impact of said at least one impactor; and processing means configured to analyse said time-varying signal to determine the frequencies and decay constants of sinusoids making up said time-varying signal. The invention also pertains to a corresponding method of characterizing a solid material sample.

The analysis of the response of the solid test piece to vibrational excitations typically involves the extraction of one or more, and preferably all, of the following parameters:
Young's modulus (E), which is indicative of the test piece's tensile elasticity;
the shear modulus (G), which is indicative of the test piece's response to shear stress;
Poisson's ratio (v), which is indicative of the test's piece deformation in directions orthogonal to an applied uniaxial stress;

These properties typically depend on the frequency or frequency range of the vibrational excitation. Hereby, the test piece may have a number of resonance frequencies, which depend on the different vibrational modes of the test piece. Important modes are hereby the bending mode and the torsion mode. The parameter values at these resonance frequencies are important numbers for describing the state of the test piece.

In many applications, solid components, e.g. in machinery, are used at different temperatures. The operation temperature can hereby fluctuate quickly and/or over a wide temperature range. For instance, brake discs in vehicles can heat up considerably and fast during operation (from basically environmental temperature to more than 500° C. in a matter of seconds). Another example is injection nozzles of kerosene for the jets of an airplane, which could heat up to more than 1500° C. during operation. The high temperature range may considerably affect the material properties of the component, and in particular the elastic properties such as the abovementioned Young's modulus, shear modulus and Poisson's ratio. For instance, it can generally be expected that a solid becomes more flexible at higher temperature due to a weakening of the internal bonds on average, which basically means that one expects E and G to decrease gradually with increasing temperature.

At different temperatures, solid components may have different material properties. This can affect the component's functioning. It is important to find out at which temperatures or temperature ranges the component's normal or intended functioning is hindered. This can be due to bulk properties of the material, defects which can be induced by altering the temperature, defects which may become more important at higher temperature, variability of expansion different parts of the component, etc. Concrete examples of the temperature-dependence of the component's material properties are:
general change of elasticity properties, which make the component less rigid, thereby hindering its proper functioning, for instance a brake disc may become too elastic at high temperature to allow proper braking,
a phase transition at a certain temperature or within a certain temperature range could seriously change the component's material properties,
a chemical reaction could equally alter the component's material properties,
precipitations of a stoichiometric different phase, e.g. in an alloy, could be present in a material due to for instance a faulty production method, and lead to an internal material boundary between materials having different temperature-dependent expansion. Clearly this could lead to severe problems,
laminates or other layered components, whereby the adhesion of one layer to the next could degrade at increased temperature.

In order to test for the proper functioning of solid components at different temperatures and/or throughout the full temperature range of intended operation, the material properties of a test piece need to be measured at different temperatures. Hereby, the test piece could for instance be the full component, part of the component, or a piece of the same material of the component. Testing is preferably done in a controlled environment allowing control over at least the temperature. At different temperatures, the material properties are then measured.

The inventors have found that measuring the material properties of a test piece over a wide temperature range, which could span from less than −50° ° C. to more than 2000° C., can be very difficult in practice. Creating a temperature-controlled environment for such a temperature range typically requires an oven with a number of vibration-producing components. Clearly, the background vibrations created by the oven can interfere with the measurement process. These background vibrations typically worsen at higher temperatures. Furthermore, since one may expect some material properties (e.g. E and G) to decrease with increasing temperature, the signal will also decrease. Both effects will lead to a lower signal-to-noise (STN) ratio at high temperatures.

The present invention aims to solve the problem of a worsening STN ratio for acoustic measurements on test pieces at high temperatures.

Furthermore, the present invention also provides a relatively cheap and accurate method of determining one or more thermal expansion parameters of a material, by means of an acoustic measurement technique.

SUMMARY OF THE INVENTION

In a first aspect, the present invention relates to a method for acoustically measuring material properties of a test piece at high temperatures, comprising the steps of:
  a. heating the test piece to within a testing temperature range;
  b. performing a background measurement within said testing temperature range by capturing a vibrational signal from the test piece within a calibration period, thereby obtaining a noise signal;
  c. performing an acoustic measurement on said test piece within said testing temperature range and within a testing period by:
    c1. imparting a vibrational excitation onto the test piece;
    c2. capturing a vibrational signal of the test piece within the testing period, thereby obtaining a vibrational response signal to said vibrational excitation, and
  d. obtaining the material properties of the test piece by analysing the vibrational response signal, thereby taking into account the noise signal.

Firstly, taking into account the background noise of the environment when performing the analysis of the vibrational response, leads to a better determination of the material properties. Secondly, by taking the background noise into account in the same testing temperature range as for the acoustic measurement, the inventors have found that a much better analysis of the vibrational response can be performed. This is because the noise can be highly dependent on the temperature range due to e.g. heating elements, ventilators or any other equipment or equipment components used to perform the measurement, each of which could behave differently in different temperature ranges.

The inventors have further found that the best results are achieved if the background measurement is performed by doing all the steps of the acoustic measurement, with the exception of imparting the vibrational excitation onto the test piece. Hence, in a preferred embodiment, step b of performing the background measurement comprises performing all the steps of step c of performing the acoustic measurement, with the exception of step c1 of imparting the vibrational excitation onto the test piece. This applies to the above described method as well as to all embodiments of the method which are described later in this document and in the claims.

In addition to the method, the present invention also concerns a system for acoustically measuring material properties of a test piece at high temperatures, comprising:
  a heating chamber comprising a heating element for bringing the test piece within a testing temperature range;
  a sensor configured to capture a vibrational signal from the test piece during a period;
  an impact system comprising an impactor and an impactor actuator, for imparting a vibrational excitation onto a test piece located in the heating chamber;
  a control system in connection with the heating chamber, the sensor and the impactor, the control system configured to:
    instruct the heating chamber to bring the test piece within a testing temperature range;
    during a testing period, instruct the impact system to actuate the impactor with the impactor actuator such that a vibrational excitation is mechanically imparted by the impactor onto a test piece located in the heating chamber, and obtain from the sensor a vibrational response signal to said vibrational excitation,
    during a calibration period, instruct the impact system to actuate the impactor with the impactor actuator such that the impactor does not mechanically impart a vibrational excitation onto the test piece located in the heating chamber, and obtain from the sensor a noise signal, and
  obtain the material properties of the test piece by analysing the vibrational response signal, thereby taking into account the noise signal.

In a second aspect, the present invention concerns a thermal expansion measurement method for obtaining a thermal expansion parameter of a test piece. This thermal expansion measurement method comprises the steps of:
  extracting at least two resonance frequencies from experimental data at a first temperature,
  obtaining a first value of a first dimension parameter from said at least two resonance frequencies at said first temperature,
  comparing said first value of said first dimension parameter at said first measurement temperature with a second value of said first dimension parameter at a second temperature,
  computing the thermal expansion parameter from said comparison.

Hereby the at least two resonance frequencies at the first temperature are material properties of the test piece, which can preferably be obtained via the acoustic measurement method described above and further in this document. The system for acoustically measuring material properties of a test piece at high temperatures as described above and further in this document, may preferably be used to obtain the at least two resonance frequencies.

BRIEF DESCRIPTION OF THE FIGURES

These and other features and advantages of embodiments of the present invention will now be described in more detail with reference to the attached drawings, in which.

DETAILED DESCRIPTION OF THE INVENTION

In known Impact Excitation Technique (IET) procedures, the test piece is positioned in such a way that it can vibrate substantially unhindered upon being impacted. This can be achieved by placing the sample on a piece of lightweight foam or resting it on linear supports (e.g. wires or narrow bars) that are judiciously placed under the zeros (nodes) of the vibration mode to be excited. The excitation is performed by impacting the sample at an anti-node, i.e. a point where the local amplitude of the induced motion is maximal for the mode of interest.

Figure 1:
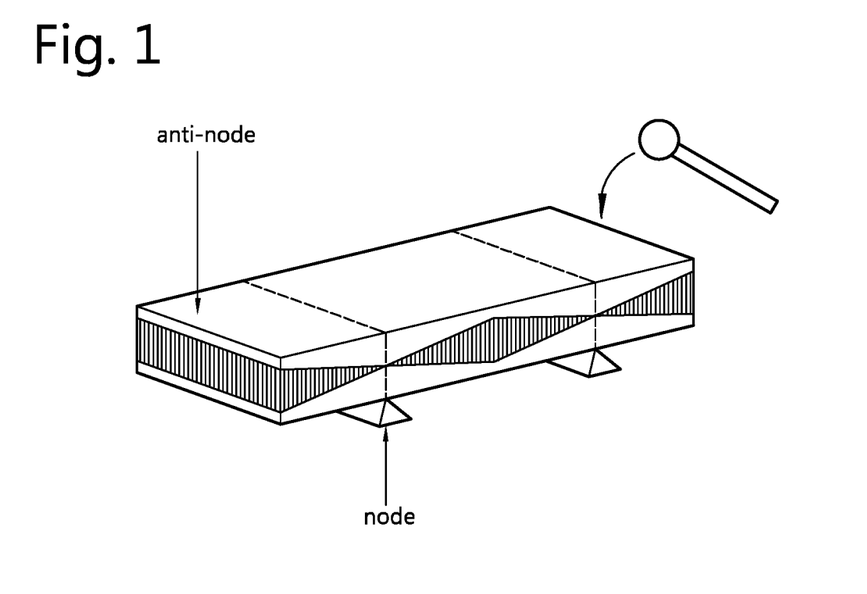
FIG. 1 schematically illustrates the vibration induced in a beam-shaped test piece upon excitation in the flexure mode.

FIG. 1 schematically illustrates the vibration induced in a beam-shaped test piece upon excitation in the flexure (in particular, out-of-plane vibration) mode. The eigenfrequency $f_f$ of this vibration mode is indicative of the sample's dynamic Young's modulus E. For the illustrated beam with mass m, length L, width b, and thickness t, one may use the following relation:

$$E = 0.9465 \left(\frac{mf_f^2}{b}\right)\left(\frac{L^3}{t^3}\right)T$$

with the correction factor T defined as $$T = 1 + 6.585\left(\frac{t}{L}\right)^2 \text{ if } L/t \geq 20.$$

Figure 2:
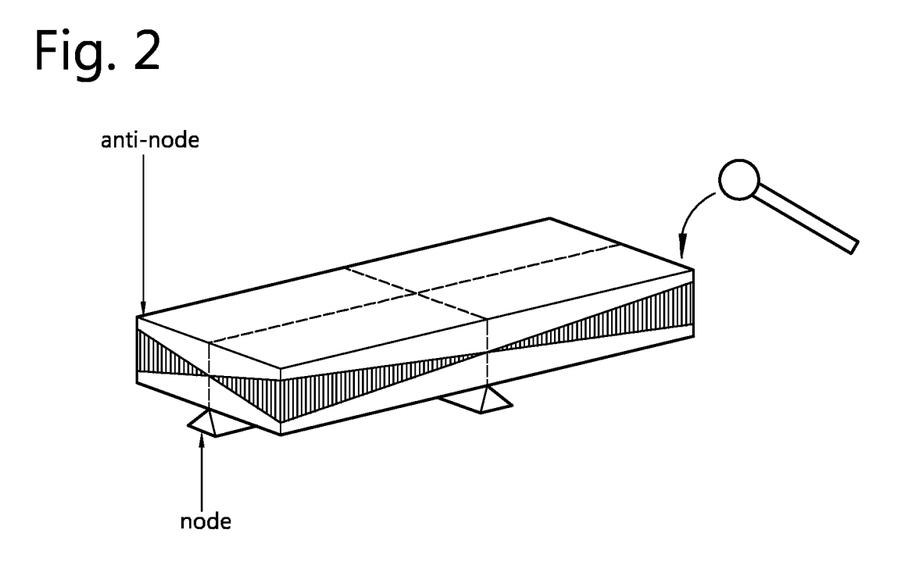
FIG. 2 schematically illustrates the vibration induced in a beam-shaped test piece upon excitation in the torsion mode.

FIG. 2 schematically illustrates the vibration induced in a beam-shaped sample under test upon excitation in the torsion mode. The eigenfrequency ft of this vibration mode is indicative of the sample's shear modulus. For the illustrated beam with mass m, length L, width b, and thickness t, one may use the following relation:

$$G = \frac{4Lmf_t^2}{bt}R$$

with the correction factor R defined as $$R = \left[\frac{1+\left(\frac{b}{t}\right)^2}{4-2.521\frac{t}{b}\left(1-\frac{1.991}{e^{\pi\frac{b}{t}}+1}\right)}\right]\left[1+\frac{0.00851b^2}{L^2}\right] - 0.060\left(\frac{b}{L}\right)^{\frac{3}{2}}\left(\frac{b}{t}-1\right)^2.$$

These known ways to determine E and G rely only on the peak frequencies in the spectrum of the sample's response. The inventor has found that, although a shift in E and/or G relative to the expected values may by itself be indicative of a defect in the sample, an abnormally fast decay of certain frequency components is a more reliable predictor of such defects.

The inventor has found that the response of a solid test piece to an impact excitation is physically close to a sum of exponentially decaying sinusoids. By assuming this particular mathematical form of the excitation response, based on the underlying physics of the phenomenon, better accuracy can be obtained than by simply extracting peaks in the (fast) Fourier transform. The decay constants provide more insight in the presence of defects than the mere identification of the resonance frequency of the test piece. The identification of the decay constants hereby constitutes a harmonic inversion problem, which can be solved by known mathematical methods.

Furthermore, the inventor has found that the material properties E and G can vary, depending upon the temperature of the test piece. This can be observed in an acoustic measurement, whereby the test piece's material structure may change with temperature such a shift of the resonance frequencies occurs with changing temperature. A slow variation of the resonance frequencies with temperature could be expected due to e.g. a slow weakening of the internal bounds or a slow increase of bulk and surface defects, which tend to lead to a decrease of E and G. However, a sudden or more-than-expected variation of the material properties within a certain temperature range tends to be indicative of new types of defects occurring at that temperature range. Also, even if the material properties vary slowly, the present method and system allow to determine at which point the material properties would have changed to such a degree that the test piece or any component made from the same material or in the same production process as the test piece, does not comply with desired specifications.

In a preferred embodiment, the vibrational excitation of step c1 is mechanically induced onto the test piece, preferably by using an impactor which is configured to contact the test piece in step c1 and which is configured not to contact the test piece in step b.

In an embodiment of the invention, the impact system comprises a ballistic impactor and the impact actuator is configured to give an impulse to said ballistic impactor. Preferably, the method of the present invention is executed using said impact system, whereby in the acoustic measurement step a measurement impulse is provided to the ballistic impactor which imparts a vibrational excitation onto the test piece and whereby in the background measurement step, a background impulse is provided to the ballistic impactor which does not impart a vibrational excitation onto the test piece. In this embodiment, the background impulse is preferably as close to the measurement impulse as possible. In an embodiment, the measurement impulse and the background impulse are different in magnitude by a factor of at most 2, more preferably at most 1.8, still more preferably at most 1.6, yet more preferably at most 1.4, even more preferably at most 1.2, and most preferably at most 1.1. Alternatively or additionally, the measurement impulse and the background impulse are different with respect to direction and preferably differ by an angle of at most 60°, more preferably at most 45°, still more preferably at most 35°, yet more preferably at most 25°, even more preferably at most 15°, and most preferably at most 5°.

In a more preferred embodiment, the ballistic impactor is configured to approach the test piece from below along a vertical direction. Hereby, preferably, the measurement impulse provided to the ballistic impactor is configured to mechanically contact the test piece and the background impulse provided to the ballistic impactor is configured to fall short of reaching the test piece, whereby in a preferred embodiment the background impulse is at least 50% of the measurement impulse, more preferably at least 60%, still more preferably at least 70%, yet more preferably at least 80%, even more preferably at least 90%. It must be noted that the closer the background impulse is to the measurement impulse, the better the obtained noise signal is, and the more accurate the obtained material properties are.

Figure 3:
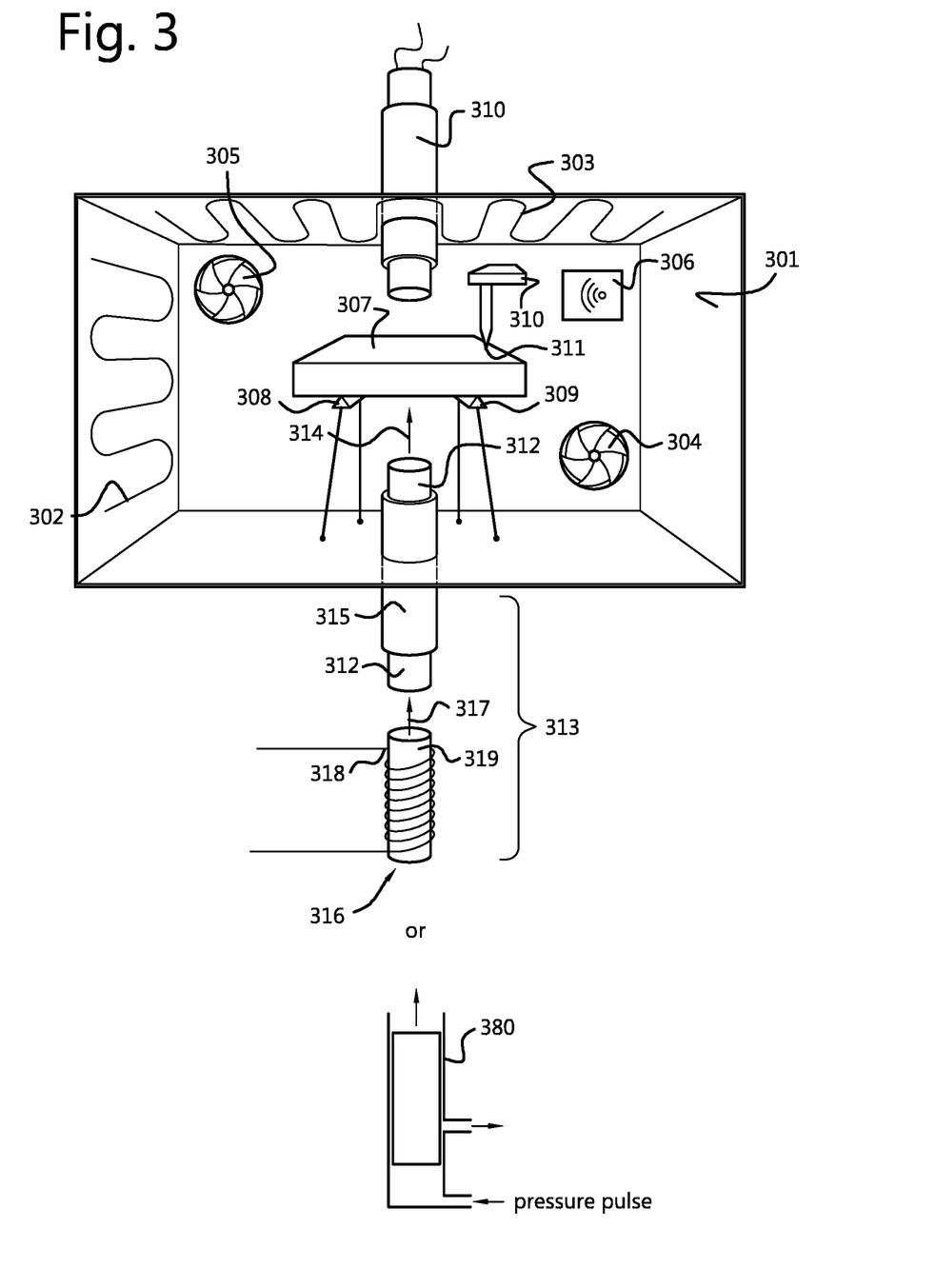
FIG. 3 schematically illustrates an embodiment of the measurement system according to the present invention.

An embodiment comprising a ballistic impactor which is configured to approach the test piece from below along a vertical direction, is illustrated in FIG. 3.

FIG. 3 shows a heating chamber (301) comprising a set of heating elements (302, 303, 304, 305, 306) capable of bringing the heating chamber and/or the test piece to a desired temperature or desired temperature range. Heating elements (302, 303) may be attached to a heating chamber wall and provide heat thereto, e.g. by heat exchange with a high pressure fluid at high temperature, by electrical resistance heating, by magnetic induction, etc. The heat of these wall-heating elements can be distributed into the heating chamber, e.g. by ventilators (304, 305). The ventilators (304, 305) may also be arranged to provide a warm fluid such as heated air or steam, to the heating chamber. A heating element may also comprise a radiative heating element, such as a microwave element (306). The heating chamber preferably also comprises one or more thermometers for measuring the actual temperature in the heating chamber and/or of the test piece, and preferably also comprises a control circuit arranged for controlling the temperature of the test piece and/or the heating chamber.

The test piece (307) is suspended by a support structure (308, 309) which allows the test piece to vibrate as freely as possible, e.g. by supporting at the location of vibrational nodes of the test piece. An acoustic sensor (310), or multiple acoustic sensors, which may comprise a microphone or a laser-interferometer, can be brought into contact (311) with the test piece, preferably at a well-defined location, or a waveguide tube can be used for guiding the acoustic response to an acoustic sensor, preferably one end of the waveguide being brought nearby or in direct contact with the test piece in the heating chamber and another end preferably being located outside of the heating chamber. The latter embodiment allows the place the sensor outside of the heating chamber.

In a preferred embodiment, the acoustic sensor comprises a laser interferometer. A laser interferometer is particularly useful for measurements in vacuum, and allows contactless measurements. Alternatively or additionally, the acoustic sensor may comprise an ultrasonic measurement sensor and/or a time-of-flight sensor and/or a Doppler-based sensor, for instance as described in:

S-R. Huang, R. M. Lerner, K. J. Parker, "Time domain Doppler estimators of the amplitude of vibrating targets", J. Acous. Soc. Am., 91(2), 965-974 (1992);

J. Tapson, "High precision, short range ultrasonic sensing by means of resonance mode-locking", Ultrasonics, 33, 6, 441-444 (1995)), and in R. Kazys, R. Sliteris, L. Mazeika, "Ultrasonic technique for Vibration Measurements", Proceedings of the 15th World Conference on Non-Destructive Testing, 15-21 Oct. 2000 in Rome, https://www.ndt.net/article/wcndt00/papers/idn246/idn246.htm.

Also these types of sensor may be used for contactless measurements.

In an embodiment, the method of the present invention is performed whereby the heating chamber comprises a pressure which is lower than the atmospheric pressure, preferably 0.5 bar or less, more preferably 0.2 bar or less, most preferably essentially a vacuum pressure. Hereby, preferably a laser interferometer is used to allow contactless vibrational measurement at low to zero pressure. Measurements at reduced to zero pressure dampen surrounding noises, thereby increasing the signal-to-noise ratio.

The impact system comprises a ballistic impactor (312) which can be provided with an impulse by an impactor actuator (313). The ballistic impactor (312) is a ceramic rod which can withstand high temperatures and whose properties do not change considerably with temperature. It can be shot upwards (314) towards the test piece using the impactor actuator (313), which comprises:

a guiding tube (315) through the bottom of the heating chamber, for guiding the ballistic impactor along a preferably vertical direction;

an electromechanically operated hammer (316) arranged to impart a, preferably vertical, impulse (317) to the impactor (312). The hammer (316) may comprise an electrical coil (318) and a movable rod or bullet (319) which can move depending on the electrical current flowing through the coil (318). An example of such a system is presented in U.S. Pat. No. 6,782,970 B2, whereby in the present invention the bullet of the impactor actuator imparts an impulse to the ceramic impactor (312) rather than directly to the test piece. Alternatively, a pressure-driven impactor or a pressure-driven impact actuator (380) for imparting an impulse to the impactor may be used.

When performing step b, the impactor actuator is arranged to provide an impulse to the ballistic impactor which brings it up to within 2 cm below the test piece, but without touching the test piece. When performing step c, and in particular step c1, the impactor actuator is arranged to provide an impulse to the ballistic impactor which brings it into contact with the test piece and thereby mechanically induces a vibrational excitation to the test piece. During step b, the background noise can be measured. This noise may arise from e.g. the heating elements, but also, and perhaps mainly, from the impactor actuator and the impactor which also make noise which could be picked up by the sensor.

In an embodiment of the invention, the steps a to d are performed more than once, and preferably repetitively, at the same temperature, at different temperatures or within different temperature ranges. In a preferred embodiment, the test piece is heated up continuously, whereby the steps a-d are performed within subsequent temperature ranges.

For example, a test piece can be heated up continuously at a rate of 1° C./s, starting from room temperature (20° C.). The steps a-d can then be performed regularly every 20 s, which means that the first set of steps a-d are performed in the temperature range of 20 to 40° C., the second set of steps a-d are performed in the temperature range of 40 to 60° C., and further on up to e.g. a maximum temperature range of 1780 to 1800° C. Note, however, that the temperature ranges do not need to be equally large, but may for instance be smaller for temperature ranges of interest. E.g. if one knows that the test piece or a component made from the same material as the test piece will be mainly used at temperatures between 700 and 800° C., one could decide to measure the material properties more accurately between these temperatures by taking smaller temperature ranges, e.g. spanning 5° C.

Further also note that the measurements performed in steps b and/or c, could be combined with measurements performed in steps b and/or c at other temperatures in order to obtain a more accurate noise signal and/or vibrational response signal. For instance, suppose one performs steps a-d in the temperature range 80° C. to 100° C. and also in the temperature range 100° C. to 120° C. Hereby one could have executed step b the first time in a temperature subrange of 82-87° C. and the second time in a temperature subrange of 102-107° C., while step c could have been executed a first time in a subrange of 92-97° C. In such case, the analysis in step d could be performed taking into account the two noise signals obtained in the two times step b was performed. Hence, in a preferred embodiment, steps a, b, c and/or d are performed two times or more within a temperature range. Alternatively or additionally, steps a, b, c and/or d may be performed multiple times at different temperature ranges which may overlap.

In an embodiment, the control system comprises processing means configured to analyze the vibrational response signal by taking into account the noise signal to determine the material properties of the test piece.

Hereby the processing means may preferably be configured to subtract the noise signal from the vibrational response signal in the time domain or, more preferably, in the frequency domain by using a Fourier transform or a fast Fourier transform or a Harmonic decomposition to the captured signals. The subtraction may also be performed in a combination of the time domain and the frequency domain. The processing means is preferably configured to analyze the time-varying signal to determine the frequencies and decay constants of sinusoids making up the time-varying signal, i.e. it solves a harmonic inversion problem. The problem of a harmonic inversion, which more generally consists of determining frequencies, decay constants, amplitudes, and phases of the sinusoids making up a discrete-time, finite-length signal that consists of a sum of a finite number of such sinusoids in a given bandwidth, is well known in literature, but has not been associated with IET to date. Vladimir A. Mandelshtam and Howard S. Taylor have described the use of the general filter-diagonalization method of Wall and Neuhauser to solve this problem by recasting the harmonic inversion problem as the one of a small matrix diagonalization in their seminal paper "Harmonic inversion of time signals and its applications", The Journal of Chemical Physics 107, 6756 (1997). Computer-based implementations of this technique are known in the art, including the "Harminv" program by Steven G. Johnson of the Massachusetts Institute of Technology. The result of the analysis may be output to the screen 140 or to any other suitable interface for storage or further processing by other equipment.

The processing means may consist of one or more dedicated hardware components (e.g. ASIC), appropriately configured configurable hardware components (e.g. FPGA), microprocessors provided with suitable software, or a combination of the above. The same components may also perform other functions.

In a preferred embodiment of the present invention, the test piece is a workpiece, an apparatus or a component of an apparatus. In another preferred embodiment of the invention, the test piece comprises a well-defined shape, preferably a beam shape, and is made from the same material of, or using the same production technique of, a workpiece, an apparatus or a component of an apparatus.

Figure 4:
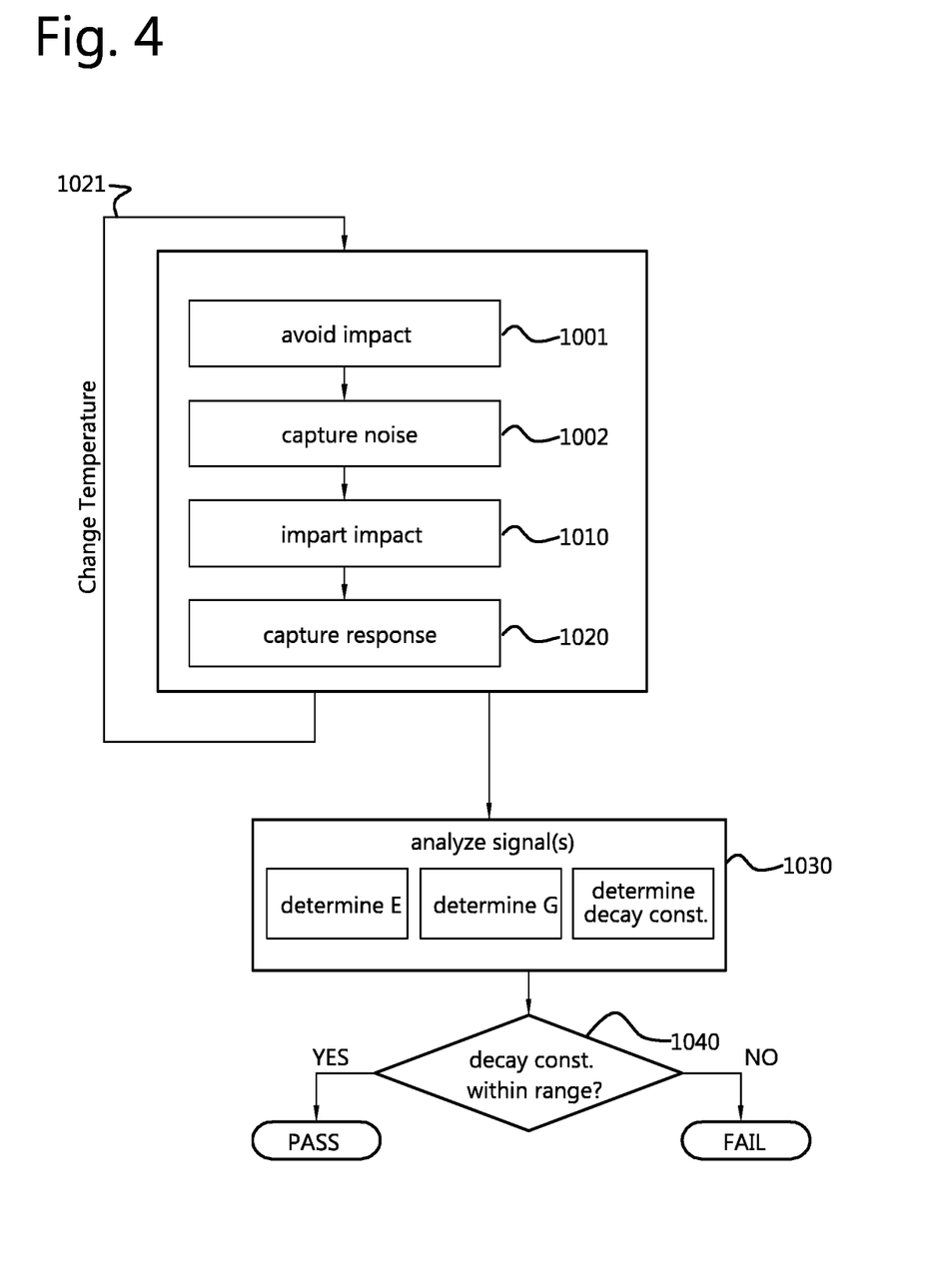
FIG. 4 schematically illustrates an embodiment of the measurement method according to the present invention.

FIG. 4 illustrates an embodiment of the method according to the present invention. In a first step a, the temperature is brought within a first temperature range (1021). Step b is then performed (1002) whereby care is taken that no impact is provided onto the test piece (1001), whereby preferably an impact system is actuated, but in such a way that impact is avoided. Step c is then performed whereby an impact is imparted onto the test piece (step c1, 1010) and the vibrational response signal is captured (step c2, 1020). The signals are then analysed (step d, 1030) whereby E, G, v and/or other properties (in particular also the decay constants) are obtained within the temperature range of step a. The impact-avoiding actuation step (1001), noise capturing step (1002), impact step (1010) and response capturing step (1020) may be performed repeatedly, before the signals are analyzed (1030) (as illustrated, for example when the apparatus has multiple impactors operated consecutively), or alternatively, each captured signal may be analyzed separately. Hereby, the noise signals and/or vibrational response signals at different temperatures or temperature ranges may be combined in the analysis of step d to obtain more accurate values for the material properties and/or to determine the temperature-dependence of these material properties.

Depending on the chosen excitation mode, the analyzing 1030 may further comprise determining a dynamic Young's modulus (E) or a shear modulus (G) from the frequencies in the spectrum of the response, in particular by identifying the peak frequency and applying a formula such as the ones provided above.

Preferably, the analyzing further comprises comparing 1040 the decay constants to reference values. This step allows the method according to the present invention to be used for quality control purposes. Indeed, a method of controlling a quality of an article of manufacture, comprises characterizing at least a part of the article of manufacture as said solid material sample using the method described above, signaling a "pass" condition 1040/YES if the decay constants are within a predetermined margin of said reference values; and declaring a "fail" condition 1040/NO if the decay constants are outside said predetermined margin of said reference values. Hence, according to an aspect of the present invention, there is provided a method of controlling a quality of an article of manufacture, the method comprising: characterizing at least a part of said article of manufacture as said test piece using the method as described above; signaling a "pass" condition if said decay constants are within a predetermined margin of said reference values; and declaring a "fail" condition if said decay constants are outside said predetermined margin of said reference values.

The present invention also pertains to a computer program product comprising coding means configured to cause a processor to carry out the computation steps of the methods described above.

As indicated before, in a second aspect, the present invention concerns a thermal expansion measurement method for obtaining a thermal expansion parameter of a test piece, comprising the steps of:

extracting at least two resonance frequencies from experimental data at a first temperature, obtaining a first value of a first dimension parameter from said at least two resonance frequencies at said first temperature, comparing said first value of said first dimension parameter at said first measurement temperature with a second value of said first dimension parameter at a second temperature, computing the thermal expansion parameter from said comparison.

Hereby the at least two resonance frequencies at the first temperature are material properties of the test piece, which can preferably be obtained via the acoustic measurement method described above and further in this document. The system for acoustically measuring material properties of a test piece at high temperatures as described above and further in this document, may preferably be used to obtain the at least two resonance frequencies.

In the thermal expansion measurement method, the second value of the first dimension parameter at the second temperature may be a known reference value, e.g. a known dimension of the test piece at room temperature or at 0° C. or at another predefined temperature, or it may also be obtained via an extraction of the two resonance frequencies from experimental data at the second temperature, preferably said two resonance frequencies at the second temperature being obtained as material properties of the test piece using a method and/or a system for acoustically measuring material properties of a test piece as described in the present document.

The thermal expansion parameter can preferably be
- a size dimension, e.g. a length, a width, a thickness, a surface, a volume; in such case, the thermal expansion parameter is preferably a difference in value between the size dimension at the first temperature and at the second temperature;
- an absolute expansion ratio such as a linear expansion ratio, which preferably is obtained by taking a ratio of a size at a first temperature and a size at the second temperature;
- a relative expansion ratio, which preferably is obtained by taking a ratio of a difference in value between the size dimension at the first temperature and at the second temperature, with a reference value of the size dimension. This reference value may be any well-defined reference value, and preferably is the value of the size dimension at the first temperature or at the second temperature or at a predefined reference temperature;
- a thermal expansion coefficient or an average thermal expansion coefficient within the interval between the first temperature and the second temperature, which preferably is obtained by taking a ratio between a relative expansion ratio and the temperature difference between the first temperature and the second temperature;
- an anisotropy ratio, preferably obtained by taking a ratio of a first dimension and a second dimension different from the first at a first temperature and comparing its value to the same ratio at a second temperature. This may lead for example to an anisotropy ratio of thermal expansion coefficients, i.e. a ratio of the thermal expansion coefficient along a first direction and the thermal expansion coefficient along a second direction, or the average thereof in the interval between the first temperature and the second temperature.

The thermal expansion parameter may also be any combination and/or derived quantity of the above parameters.

The thermal expansion parameter may in a preferred embodiment be computed analytically. A preferred manner of analytical computation is as follows, illustrated by using the standard ASTM C215-02 for computing an E-modulus on the basis of impulse excitation for a concrete test piece:
- a bending mode resonance frequency is obtained at the first temperature
- a longitudinal compression mode resonance frequency is obtained at the first temperature the bending mode resonance frequency $f_{f1}$ is related to the E-modulus, e.g. via $$E = 0.9465 \left( \frac{m f_{f1}^2}{b} \right) \left( \frac{L^3}{t^3} \right) T$$

for a beam-shaped test piece with mass m, length L, thickness t and width b, and with the correction factor T defined as $$T = 1 + 6.585 \left( \frac{t}{L} \right)^2 \text{ if } L/t \geq 20$$

the longitudinal compression mode resonance frequency $f_{f2}$ is related to the E-modulus, e.g. via $$E = 4 \left( \frac{m f_{f2}^2}{b} \right) \left( \frac{L}{t} \right)$$

for a beam-shaped test piece with mass m, length L, thickness t and width b,
equalling the values of the E-modulus, allows to obtain a size dimension at the first temperature $T_1$:

$$\frac{L}{t} = \sqrt{\frac{0.9465 f_{f1}^2}{4 f_{f2}^2} - 6.585}$$

comparison with the value of the size dimension at the second temperature $T_2$, then allows computation of e.g. an anisotropy ratio $$\frac{\hat{\alpha}_L}{\hat{\alpha}_t}$$

of thermal expansion coefficients averaged between the first temperature and the second temperature:

$$\frac{\hat{\alpha}_L}{\hat{\alpha}_t} = \frac{1-a}{1+a} \text{ wherein}$$

$$a = \frac{\frac{L}{t}(T_1) - \frac{L}{t}(T_2)}{\frac{L}{t}(T_1) + \frac{L}{t}(T_2)} = \frac{1 - \frac{\hat{\alpha}_L}{\hat{\alpha}_t}}{1 + \frac{\hat{\alpha}_L}{\hat{\alpha}_t}}$$

Herein, $\hat{\alpha}_L$ is the thermal expansion coefficient in the longitudinal direction, averaged within the temperature interval $[T_1, T_2]$ and $\hat{\alpha}_t$ is the thermal expansion coefficient in the thickness direction, averaged within the same temperature interval $[T_1, T_2]$. This ratio can by itself be important to know for certain types of materials, in particular to determine and quantifying the anisotropy of the material, and a change of this ratio in a certain temperature interval could be indicative of a phase transformation or a fracture in the test piece.

Hereby, the test piece may for instance have dimensions of (10 cm×2 cm×5 mm) at room temperature (20° C.), which values may thus serve as the value of the size dimensions at the second temperature.

Note hereby, that the values for the resonance frequencies at the first temperature may preferably be obtained in a single acoustic measurement at the first temperature, and optionally also the values for the resonance frequencies at the second temperature may preferably be obtained in a single acoustic measurement at the second temperature. Preferably these are obtained using the acoustic measurement method and/or system of the present invention. Hereby, resonance frequencies of different modes may be easily measured by identifying peaks in the acoustic response in the frequency domain. In some cases, uncertainty may arise when identifying which resonance frequencies belong to which modes. In such cases, the identification of the resonance frequencies to the modes may be obtained via a modelling and/or simulation calculation, or via a set of additional acoustic measurements, preferably whereby the test piece is impacted upon in such a way as to excite a specific mode.

As indicated above, the comparison may be made using an analytic method, e.g. a method based on equations, whereby the value of the dimension parameter is extracted analytically. Alternatively or additionally, the comparison can be made using a simulation method, e.g. whereby the simulation method comprises modelling the test piece using a set of model parameters which are related to the dimension parameter, and whereby the simulation method comprises a resonance computation algorithm to obtain the at least two resonance frequencies, whereby the model parameters are altered to optimally reproduce the at least two resonance frequencies, thereby obtaining a set of optimal model parameters, and whereby a value of the dimension parameter is calculated from the set of optimal model parameters. The simulation method may preferably comprise a finite-element method.

From two measured resonance frequencies, one can derive e.g. the E-modulus and the value of a size dimension, using the equations.

More resonance frequencies can be used, e.g.
a torsion resonance frequency,
a first harmonic of the bending mode
a second harmonic of the bending mode
a first harmonic of the longitudinal compression mode
a second harmonic of the longitudinal compression mode
or any combination or derived quantity thereof.

Note that harmonics may depend on proportions of the test piece, such that for non-isotropic expansion, harmonic resonance frequencies are not necessarily multiples of the ground mode resonance frequencies. This allows to obtain values for more than one size dimension parameter, which is useful in case of non-isotropic expansion. Further, by using more than two resonance frequencies, the resulting system could be overdetermined, in which case a best fit solution can be obtained, e.g. via analytical methods and/or simulation method, for the desired size dimensions.

The present invention also pertains to a computer program product comprising coding means configured to cause a processor to carry out the computation steps of the thermal expansion measurement methods described above.

The invention claimed is:

1. A method for acoustically measuring material properties of a test piece at high temperatures, comprising the steps of:

(a) heating the test piece to within a testing temperature range;
(b) performing a background measurement within said testing temperature range by capturing a vibrational signal from the test piece within a calibration period, thereby obtaining a noise signal;
(c) performing an acoustic measurement on said test piece within said testing temperature range and within a testing period by:
(c1) imparting a vibrational excitation onto the test piece;
(c2) capturing a vibrational signal of the test piece within the testing period, thereby obtaining a vibrational response signal to said vibrational excitation, and
(d) obtaining the material properties of the test piece by analyzing the vibrational response signal, thereby taking into account the noise signal,
wherein the vibrational excitation of step c1 is mechanically induced onto the test piece,
wherein an impact system comprising a ballistic impactor and an impactor actuator is used,
wherein the impact actuator is configured to give an impulse to said ballistic impactor, and using said ballistic impactor for imparting a vibrational excitation onto the test piece,
wherein in the acoustic measurement step c, a measurement impulse is provided to the ballistic impactor which imparts a vibrational excitation onto the test piece in step c1,
wherein in the background measurement step b, a background impulse is provided to the ballistic impactor which does not impart a vibrational excitation onto the test piece, and
wherein the noise signal comprises noise arising from the impactor actuator and the ballistic impactor.

2. The method according to claim 1, wherein the ballistic impactor is configured to approach the test piece from below along a vertical direction.

3. The method according to claim 2, wherein the measurement impulse provided to the ballistic impactor is configured to mechanically contact the test piece and the background impulse provided to the ballistic impactor is configured to fall short of reaching the test piece.

4. The method according to claim 1, wherein the steps a to d are performed more than once at the same temperature, at different temperatures or within different temperature ranges.

5. The method according to claim 4, wherein the test piece is heated up continuously,
wherein the steps a-d are performed within subsequent temperature ranges.

6. The method according to claim 1, wherein in step d, the temperature-dependence of the material properties are determined.

7. The method according to claim 1, wherein in step d, a Young's modulus, a shear modulus and/or a Poisson modulus are determined.

8. The method according to claim 1, wherein in step d, decay constants of the material properties are determined, said decay constants being decay constants of sinusoids making up the time-varying vibrational response signal.

9. A system for acoustically measuring material properties of a test piece at high temperatures, comprising:
a heating chamber comprising a heating element for bringing the test piece within a testing temperature range;
a sensor configured to capture a vibrational signal from the test piece during a period;

an impact system comprising an impactor and an impactor actuator, for imparting a vibrational excitation onto a test piece located in the heating chamber;

a control system in connection with the heating chamber, the sensor and the impactor, the control system configured to:

instruct the heating chamber to bring the test piece within a testing temperature range;

during a testing period, instruct the impact system to actuate the impactor with the impactor actuator such that a vibrational excitation is mechanically imparted by the impactor onto a test piece located in the heating chamber, and obtain from the sensor a vibrational response signal to said vibrational excitation, during a calibration period, instruct the impact system to actuate the impactor with the impactor actuator such that the impactor does not mechanically impart a vibrational excitation onto the test piece located in the heating chamber, and obtain from the sensor a noise signal, and obtain the material properties of the test piece by analyzing the vibrational response signal, thereby taking into account the noise signal, wherein the noise signal comprises noise arising from the impactor actuator and the impactor, wherein the impact system comprises a ballistic impactor and the impact actuator is configured to give an impulse to said ballistic impactor, wherein the impact actuator is configured to give a measurement impulse to the ballistic impactor for imparting a vibrational excitation onto the test piece in an acoustic measurement step, and wherein the impact actuator is configured to give a background impulse to the ballistic impactor for avoiding an impact onto the test piece in a background measurement step.

10. The system according to claim 9, wherein the control system comprises processing means configured to analyze the vibrational response signal by subtracting the noise signal from the vibrational response signal in the time domain or in the frequency domain, or in a combination of the time domain and the frequency domain.

* * * * *